(12) United States Patent
Mihan et al.

(10) Patent No.: US 7,964,677 B2
(45) Date of Patent: Jun. 21, 2011

(54) METHOD OF CHANGING BETWEEN INCOMPATIBLE POLYMERIZATION CATALYSTS IN A GAS-PHASE FLUIDIZED-BED REACTOR

(75) Inventors: Shahram Mihan, Bad Soden (DE); Rainer Karer, Kaiserslautern (DE)

(73) Assignee: Basell Polyolefine GmbH, Wesseling (DE)

( * ) Notice: Subject to any disclaimer, the term of this patent is extended or adjusted under 35 U.S.C. 154(b) by 426 days.

(21) Appl. No.: 12/085,079

(22) PCT Filed: Nov. 10, 2006

(86) PCT No.: PCT/EP2006/010814
§ 371 (c)(1),
(2), (4) Date: May 15, 2008

(87) PCT Pub. No.: WO2007/059867
PCT Pub. Date: May 31, 2007

(65) Prior Publication Data
US 2009/0062486 A1    Mar. 5, 2009

Related U.S. Application Data

(60) Provisional application No. 60/753,271, filed on Dec. 22, 2005.

(30) Foreign Application Priority Data

Nov. 28, 2005  (DE) .......................... 10 2005 056 775

(51) Int. Cl.
*C08F 2/34* (2006.01)
*C08F 4/78* (2006.01)
(52) U.S. Cl. ................ 526/83; 526/82; 526/84; 526/85; 526/901
(58) Field of Classification Search ............... 526/82, 526/83, 84, 85, 201, 901
See application file for complete search history.

(56) References Cited

U.S. PATENT DOCUMENTS

| | | | |
|---|---|---|---|
| 3,917,466 A | 11/1975 | Henry | |
| 4,543,399 A | 9/1985 | Jenkins, III et al. | |
| 4,764,056 A | 8/1988 | Zentgraf et al. | |
| 5,283,278 A | 2/1994 | Daire et al. | |
| 5,306,792 A | 4/1994 | Havas et al. | |
| 5,319,009 A | 6/1994 | Brokken-Zijp et al. | |
| 5,414,064 A | 5/1995 | Lux et al. | |
| 5,442,019 A | 8/1995 | Agapiou et al. | |
| 6,022,935 A * | 2/2000 | Fischer et al. | 526/129 |
| 6,417,302 B1 | 7/2002 | Bohnen | |
| 6,730,753 B2 | 5/2004 | Föttinger et al. | |
| 6,784,261 B1 | 8/2004 | Schopf et al. | |
| 6,849,699 B2 | 2/2005 | Bauer et al. | |
| 6,995,217 B2 | 2/2006 | Agapiou et al. | |
| 7,015,169 B2 | 3/2006 | Föttinger et al. | |
| 7,053,160 B1 | 5/2006 | Bingel et al. | |
| 7,238,818 B2 | 7/2007 | Ewen et al. | |
| 7,629,422 B2 * | 12/2009 | Goode et al. | 526/84 |
| 2004/0127655 A1 * | 7/2004 | Veariel et al. | 526/82 |
| 2005/0239978 A1 | 10/2005 | Bohm et al. | |
| 2007/0037935 A1 | 2/2007 | Karer et al. | |

FOREIGN PATENT DOCUMENTS

| | | |
|---|---|---|
| DE | 3543360 A1 | 6/1987 |
| EP | 571826 B1 | 5/1993 |
| WO | WO 92/14766 | 9/1992 |
| WO | WO 94/25497 | 11/1994 |
| WO | WO 00/58377 | 10/2000 |
| WO | WO 2004/060931 A1 | 7/2004 |
| WO | WO 2006/069204 A2 | 6/2006 |
| WO | WO 2007/012406 A1 | 2/2007 |

OTHER PUBLICATIONS

*Ullmann's Encyclopedia of Industrial Chemistry*, vol. A21, 4th Edition, 1992, p. 511ff.
Small et al., "Highly Active Iron and Cobalt Catalysts for the Polymerization of Ethylene", *J. Am. Chem. Soc.* 120, 1998, 4049-4050.
Britovsek, et al., "Novel Olefin Polymerization Catalysts Based on Iron and Cobalt", *J. Chem. Soc., Chem. Commun.*, 1998, 849.

* cited by examiner

*Primary Examiner* — Fred M Teskin
(74) *Attorney, Agent, or Firm* — Dilworth IP, LLC

(57) ABSTRACT

Method of changing from a polymerization using a first catalyst to a polymerization using a second catalyst which is incompatible with the first catalyst in a gas-phase reactor, which comprises the steps
a) stopping of the polymerization reaction using the first catalyst,
b) flushing of the reactor under polymerization conditions with at least one deactivating agent comprising a volatile constituent and a nonvolatile constituent in a weight ratio of from 0.1 to 1000,
c) introduction of the second catalyst into the reactor and
d) continuation of the polymerization using the second catalyst.

16 Claims, No Drawings

METHOD OF CHANGING BETWEEN INCOMPATIBLE POLYMERIZATION CATALYSTS IN A GAS-PHASE FLUIDIZED-BED REACTOR

CROSS-REFERENCE TO RELATED APPLICATIONS

This application is a national phase filing under 35 U.S.C. §371 of International Application PCT/EP2006/010814, filed 10 Nov. 2006, claiming priority to German Patent Application 102005056775.4 filed 28 Nov. 2005 and provisional U.S. Appl. No. 60/753,271 filed 22 Dec. 2005; the disclosures of International Application PCT/EP2006/010814, German Patent Application 102005056775.4, and U.S. Appl. No. 60/753,271, each as filed, are incorporated herein by reference.

The invention relates to a method of changing from a first catalyst to a second catalyst which is incompatible with the first catalyst.

Gas-phase polymerization processes are economical processes for the polymerization of $C_2$-$C_8$-α-olefins. Such gas-phase polymerization processes can, in particular, be carried out as gas-phase fluidized-bed processes in which the polymer particles are kept suspended by means of an appropriate gas stream. Processes of this type are described, for example, in EP-A-0 475 603, EP-A-0 089 691 and EP-A-0 571 826, whose contents are hereby fully incorporated by reference.

In the production of various polymer grades, it is frequently necessary to change from a first catalyst to a second catalyst. This is unproblematical when the first catalyst and the second catalyst are compatible with one another. However, the change from a first catalyst to a second catalyst which is incompatible with the first presents considerable problems and has therefore been the subject of much effort.

Firstly stopping the polymerization using the first catalyst by means of a deactivating agent, emptying the reactor, cleaning it and starting it up again using the new catalyst has been known for a long time. Thus, WO 00/58377 discloses a discontinuous method of changing from a first catalyst to a second incompatible catalyst, in which the polymerization using the first catalyst is stopped, the polymer is removed from the reactor, the reactor is flushed with nitrogen, a new particle bed is introduced into the reactor and the polymerization is continued using the second catalyst. However, the opening of the reactor leads to deposits on the walls which have an adverse effect on the renewed start-up of the reactor.

EP-A-751965 describes a continuous method of changing catalyst from a first catalyst to a second catalyst incompatible with the first, in which the introduction of the first catalyst is interrupted, an reversible and optionally an irreversible catalyst poison is added in excess, the reactor is flushed and the second catalyst is introduced into the reactor. Although contamination of the reactor with water and air can be avoided in this way, a mixed polymer which is only in rare cases within the specification of the old or new product leaves the reactor for a prolonged transition time (a multiple of the mean residence time). Furthermore, the first catalyst has to be titrated with an equimolar amount of catalyst poison, with too little catalyst poison leading to unsatisfactory deactivation of the first catalyst and too large an amount also deactivating the new catalyst. Finally the deposits which have been formed on the walls during operation cannot be removed without opening of the reactor in a continuous transition, so that, particularly when the reactor is started up again using the reactive metallocene catalysts, there is a risk of more rapid formation of deposits on the walls, which can ultimately lead to blockages in the gas distributor plate or the discharge system.

WO 2004/060931 discloses the use of a relatively nonvolatile deactivating agent having a vapor pressure under reaction conditions of less than 133 Pa in a method of changing from a Ziegler-Natta catalyst to an MAO-based single-site catalyst which is incompatible with the first catalyst. WO 2004/060930 also provides for the use of a deactivating agent selected from among oxygen, air, CO, $CO_2$, $H_2O$, oleic acid and $NH_3$ to stop the reaction with the metallocene catalyst in a method of changing from a metallocene catalyst to a catalyst in compatible therewith. However, the discontinuous methods have the disadvantage that either the start-up of the reactor leads to stable conditions in the reactor only after a number of starts or is very time-consuming. The methods which are less time-consuming and lead to satisfactory results are, on the other hand, tailored very specifically to a particular catalyst change, so that various change-over methods using different equipment and reagents have to be kept on hand.

It was therefore an object of the present invention to overcome the abovementioned disadvantages of the prior art and provide a process which makes a reliable and simple catalyst change in a short time possible and is virtually universally applicable.

This object is achieved according to the invention by a method of changing from a polymerization using a first catalyst to a polymerization using a second catalyst which is incompatible with the first catalyst in a gas-phase reactor, which comprises the steps a) stopping of the polymerization reaction using the first catalyst, b) flushing of the reactor under polymerization conditions with at least one deactivating agent comprising a volatile constituent having a boiling point below the temperature in the reactor under polymerization conditions, which is an organic compound or a mixture of organic compounds comprising at least one functional group selected from among —OR, —NR$_2$, —SR, —O, =S, where R is hydrogen or $C_1$-$C_8$-alkyl, and a nonvolatile constituent in a weight ratio of from 0.1 to 1000, c) introduction of the second catalyst into the reactor and d) continuation of the polymerization using the second catalyst.

The present invention makes it possible to carry out a catalyst change when using different incompatible catalysts reliably and simply.

Incompatible catalysts are, for the purposes of the present invention, ones which fulfill at least one of the following conditions:

i) catalysts in which the reactivity of at least one of the catalysts is reduced by at least 50% in the presence of the other catalyst, ii) catalysts which produce polymers having at least double the mean molar mass compared to the other catalyst under the same reaction conditions, iii) catalysts which display a difference of at least 30% in the reaction rate or comonomer incorporation under the same reaction conditions.

Firstly, the polymerization reaction using the first catalyst is stopped in step a). This can be achieved in various ways, for example by simply stopping the introduction of catalyst, by introducing a deactivating agent or by reducing the temperature, the pressure or the monomer concentration in the reactor. A combination of the abovementioned ways of stopping the reaction is also possible. When Ziegler/Natta or metallocene catalysts are used as first catalyst, the reaction is preferably stopped by means of $CO_2$. When using Phillips catalysts, the reaction is preferably stopped using oxygen or lean air, i.e. air which has a reduced proportion of oxygen.

The reactor is subsequently flushed in step b) with a deactivating agent comprising a volatile constituent and a nonvolatile constituent under polymerization conditions. This can be effected while retaining the particle bed present in the reactor or after emptying and filling with a new particle bed, with the latter being preferred. Thus, a preferred embodiment of the present invention provides for the reactor to be emptied completely in a step a') and filled with a new particle bed (flushing bed) for carrying out step b).

For the purposes of the present invention, a volatile constituent of the deactivating agent is a substance or a mixture which has a vapor pressure of above 1000 Pa under the conditions in the recycle gas system. It is important that the vapor pressure is sufficiently high to ensure complete deactivation of the catalyst present in the recycle gas system. Preference is given to a vapor pressure of above 1500 Pa, preferably above 2000 Pa, at 20° C. Preference is also given to the volatile component having a boiling point below the temperature in the gas-phase fluidized-bed reactor under polymerization conditions, so that it vaporizes completely in the reactor.

For the purposes of the present invention, a nonvolatile constituent of the deactivating agent is a substance or a mixture which does not go into the gas phase, or at most goes into the gas phase in small amounts, under polymerization conditions and therefore acts essentially only in the reactor itself. It preferably has a vapor pressure of less than 1000 Pa, particularly preferably less than 100 Pa, at 20° C. In addition, the nonvolatile constituent preferably not only completely deactivates the catalyst in the reactor but also leaves a thin film on the reactor surface and thus aids renewed start-up.

The volatile constituent (V) and the nonvolatile constituent (N) are present in the deactivating agent in a weight ratio V/N of from 0.1 to 1000. Preference is given to using a weight ratio V/N of from 0.5 to 400, more preferably from 1 to 300. Particular preference is given to using the volatile constituent in a weight excess, preferably in a ratio of from 5 to 200, more preferably from 10 to 200, particularly preferably from 20 to 100. Apart from the volatile constituent and the nonvolatile constituent of the deactivating agent, further substances having a deactivating action can also be used in the reactor. In addition, the use of further auxiliaries such as antistatics, scavengers, etc., is possible. To improve meterability, the deactivating agent can comprise inert solvents, for example saturated hydrocarbons such as hexane.

The amount of deactivating agent used is dependent on the size and geometry of the reactor, so that is has to be adapted to the circumstances. It is possible, for example, to start with a small amount and increase it until complete deactivation has taken place. In general, the deactivating agent can be used in an amount of from 20 to 2000 g/h. Preference is given to amounts of from 100 to 1000 g/h, particularly preferably from 200 to 500 g/h.

According to the invention, both the volatile constituents (V) and the nonvolatile constituents (N) of the deactivating agent comprise substances or mixtures which are able to react with at least one of the catalyst constituents and thus make the catalyst inactive. Preference is given to constituents (V) or (N) which irreversibly deactivate the catalyst, i.e. no reactivation of the catalyst can be observed even when the deactivating agent is removed.

Suitable volatile constituents (V) are, for example, low molecular weight alcohols and their ethers, low molecular weight esters and amines which have a sufficient vapor pressure for them to be able to be present in gaseous form in a sufficient amount under the usual polymerization conditions and in particular also under the conditions in the recycle gas system. Preference is given to the $C_1$-$C_4$-alcohols methanol (b.p.: 65° C., 128 hPa), ethanol (78° C., 60 hPa), 1-propanol (97.4° C., 18.7 hPa), 2-propanol (82° C., 43 hPa), 1-butanol (117° C., 6.7 hPa), 2-butanol (99° C., 17 hPa), tert-butanol (82.2° C., 41.3 hPa), with the values given in brackets being the boiling point and the vapor pressure, respectively, at 20° C. Preference is also given to the $C_2$-$C_6$-ethers or to their mixtures with $C_1$-$C_4$-alcohols. Particular preference is given to 2-propanol.

Suitable nonvolatile constituents (N) are, for example, finely divided porous carbon blacks, higher polyhydric alcohols and their ethers, for example sorbitol, polyalcohols, polyalcohol ethers, polyvinyl alcohols, polyethylene glycols and their ethers with fatty alcohols, anion-active substances such as $C_{12}$-$C_{22}$-fatty acid soaps of alkali metals or alkaline earth metals, salts of alkylsulfates of higher primary or secondary alcohols of the general formula $ROSO_3M$ (M=alkali metal, alkaline earth metal) or $(RR')CHOSO_3M$, salts of mixed esters of polyfunctional alcohols with higher fatty acids and sulfuric acid, $C_{12}$-$C_{22}$-sulfonic acids or their salts of the general formula $RSO_3M$, alkylarylsulfonic acids or their salts such as dodecylbenzene sulfonic acid, phosphoric acid derivatives such as di(alkoxypolyethoxyethyl)phosphates of the general formula $[RO(CH_2CH_2O)_n]_2POOM$ or phytic acid derivatives as disclosed, for example, in EP-A 453116, cation-active deactivating agents such as quaternary ammonium salts of the general formula $R^1R^2R^3R^4NX$, where X is a halogen atom and $R^1$ to $R^4$ are alkyl radicals, preferably ones having at least 8 carbon atoms. Also suitable are, for example, metal complexes such as the cyanophthalocyanines disclosed in WO 93/24562.

Particularly suitable nonvolatile constituents (N) are nonvolatile nitrogen-comprising compounds such as amines or amides or their salts, in particular oligomeric or polymeric amines and amides. Examples which may be mentioned are polyethoxyalkylamines and polyethoxyalkylamides of the general formulae $R^1N[(R^2O)_mR][(R^3O)_nH]$ and $R^1CON[(R_2O)_mR][(R^3O)_nH]$, where $R^1$ to $R^3$ are alkyl radicals. In the case of $R^1$ preferably ones having at least 8 carbon atoms, more preferably at least 12 carbon atoms, and n, m are equal to or greater than 1, as described in DE-A 31 088 43. These are also constituents of commercial antistatics (e.g. Atmer® 163; from Uniqema). It is also possible to use salt mixtures of calcium salts of Medialanic acid and chromium salts of N-stearylanthranilic acid, as in DE-A 3543360, whose contents are hereby fully incorporated by reference, or mixtures of a metal salt of Medialanic acid, a metal salt of anthranilic acid and a polyamine as described in EP-A 636 636.

Further particularly suitable nonvolatile constituents (N) are polyamines or polyamine copolymers or mixtures of such compounds with further, in particular polymeric, compounds. Apart from simple polyamines such as polyvinylamine, suitable nonvolatile polyamines are advantageously obtained from the reaction of aliphatic primary monoamines such as n-octylamine or n-dodecylamine or N-alkyl-substituted aliphatic diamines such as N-n-hexadecyl-1,3-propanediamine with epichlorohydrin. These polyamino polyols have hydroxyl groups in addition to amino groups. An overview of such polyamine copolymers is given in U.S. Pat. No. 3,917, 456. Polymers which are particularly suitable for use together with polyamines or polyamine copolymers are polysulfone copolymers. The polysulfone copolymers are preferably largely unbranched and are made up of olefins and $SO_2$ units in a molar ratio of 1:1. An example which may be mentioned is 1-decene polysulfone. An overview of suitable polysulfone copolymers is also given in U.S. Pat. No. 3,917,466, whose contents are hereby fully incorporated by reference.

Furthermore, preference is given, according to the invention, to at least one of the volatile or nonvolatile constituents having an antistatic action. The abovementioned compounds which can be used as nonvolatile constituent, in particular, usually display a pronounced antistatic action in addition to the deactivating action.

Particular preference is given to using a mixture comprising a $C_1$-$C_4$-alcohol as volatile component and a mixture of a polyethoxyalkylamine, a polyamino polyol and an alkylarylsulfonic acid as nonvolatile component.

Step b) takes place at temperatures of from 20 to 150° C., preferably at temperatures above 50° C., more preferably above 70° C. and particularly preferably above 90° C. When a fluidized bed is used, step b) preferably takes place at 10-1° C. below, particularly preferably 5-1° C. below, the sintering temperature of the polymer.

According to the invention, the second catalyst is introduced into the reactor, i.e. the metered addition of the second catalyst is commenced, in the subsequent step c). Here, the metering device for the first catalyst can be used after flushing or a separate metering device can be used. Scavengers such as metal alkyls, in particular aluminum alkyls, which react with the moisture, oxygen and other catalyst poisons still present in the reactor are usually introduced before renewed start-up using the second catalyst.

A preferred embodiment of the present invention provides for the reactor to be emptied completely in a step b') and filled with fresh polymer powder prior to step c).

Finally, the polymerization using the second catalyst is continued in step d). Steps c) and d) are generally known to those skilled in the art.

The steps mentioned have to be carried out in the abovementioned order, with further intermediate steps being able to be carried out between the individual steps of the method.

The method of the invention is employed for changing the catalyst in a gas-phase reactor for the polymerization and copolymerization of α-olefins such as ethylene, propene, 1-butene, 1-pentene, 4-methyl-1-pentene, 1-hexene, 1-heptene and 1-octene. Ethylene and propylene, in particular ethylene, can be homopolymerized or copolymerized particularly well. Possible comonomers are, in particular, α-olefins having from 3 to 8 carbon atoms, especially propene, 1-butene, 1-pentene, 4-methyl-1-pentene, 1-hexene, 1-heptene and 1-octene and also mixtures of these α-olefins.

The polymerization can be carried out according to various gas-phase processes, for example in a gas-phase fluidized bed or in a stirred gas phase. Such gas-phase processes are known per se and are described, for example, in Ullmann's Encyclopedia of Industrial Chemistry, Vol. A 21, 4th Edition, 1992, p. 511ff, whose contents are hereby fully incorporated by reference. Preference is given to polymerization in a gas-phase fluidized-bed reactor.

The polymerization is carried out at temperatures of from 30 to 150° C., preferably from 80 to 120° C. The pressure is in the range from 5 to 80 bar, preferably from 10 to 60 bar. In one embodiment of the present invention, the polymerization is carried out at a temperature in a range delimited by an upper limit given by equation I $$T_{RMAX} = 170 + \frac{6d'}{0.84 - d'} \quad (I)$$

and a lower limit given by the equation II $$T_{RMIN} = 173 + \frac{7.3d'}{0.837 - d'} \quad (II)$$

where the variables have the following meanings:
$T_{RMAX}$ maximum reaction temperature in ° C.
$T_{RMIN}$ minimum reaction temperature in ° C.
d' absolute value of the density d of the polymer to be prepared.

According to this definition, the reaction temperature for the preparation of a polymer having the given density d must not exceed the value defined by equation I and must not be below the value defined by equation II but instead has to be between these limiting values. As regards details of the mode of operation, reference may be made to EP-B-571 826 and EP-A-1040128, whose contents are hereby fully incorporated by reference, without this implying a restriction to the use of the corresponding catalysts.

The density d of the resulting (co)polymers and thus the reactor temperature to be advantageously selected is, in the method of the invention, determined essentially by the ratios of the starting materials used, in particular the ratio of ethylene to $C_3$-$C_6$-α-olefins.

Furthermore, the reactor can also be operated with proportions of condensed material being present, as described, for example, in EP-A-089 691 or EP-A-696 293.

The method of the invention is basically suitable for the change from any polymerization catalyst to any other incompatible catalyst. Both the first and second catalysts can therefore be selected freely according to the invention, as long as the two are incompatible. The method is particularly suitable for the change from a single-site, Ziegler or hybrid catalyst to a chromium catalyst of from a Ziegler catalyst to a single-site or hybrid catalyst, without the process having to be altered, apart from slight adaptations.

Catalyst systems of the Ziegler-Natta type have been known for a long time. These systems are used, in particular, for the polymerization of $C_2$-$C_{10}$-alk-1-enes and comprise, inter alia, compounds of polyvalent titanium, aluminum halides and/or aluminum alkyls and also a suitable support material. Further details regarding Ziegler-Natta catalysts may be found, for example, in the patent applications EP-A-1184395, EP-A-1456249 or WO03099882.

Chromium catalysts of the Phillips type have likewise been known for a long time. They comprise an inert inorganic support, preferably silica gel, to which a chromium compound and, if appropriate, further transition metals such as titanium or zirconium are applied. The support is then usually calcined at temperatures of from 300 to 950° C.

For the purposes of the present invention, single-site catalysts comprise, as a difference from Phillips and Ziegler/Natta catalysts, at least one defined organic transition metal compound and usually at least one further activating compound and, if appropriate, supports and further additives and auxiliaries.

Possible organic transition metal compounds for single-site catalysts are in principle all compounds of the transition metals of groups 3 to 12 of the Periodic Table or the lanthanides which comprise organic groups and, preferably after reaction with the activator and support, form active catalysts for olefin polymerization. They are usually compounds in which at least one monodentate or polydentate ligand is bound via a sigma or pi bond to the central atom. Possible ligands include both ones which comprise cyclopentadienyl radicals and ones which are free of cyclopentadienyl radicals. Many such compounds A) which are suitable for olefin polymerization are described in Chem. Rev. 2000, Vol. 100, No. 4. Furthermore, multinuclear cyclopentadienyl complexes are also suitable for olefin polymerization.

Suitable organic transition metal compounds are, in particular, ones having at least one cyclopentadienyl-type ligand, with those having two cyclopentadienyl-type ligands generally being referred to as metallocene complexes. Particularly useful organic transition metal compounds A) having at least one cyclopentadienyl-type ligand are those of the general formula (I)

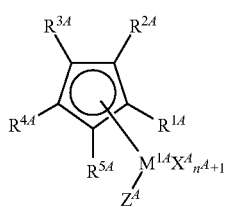
(I)

where the substituents and indices have the following meanings:

$M^{1A}$ is titanium, zirconium, hafnium, vanadium, niobium, tantaium, chromium, molybdenum or tungsten, or an element of group 3 of the Periodic Table and the lanthanides, the radicals $X^A$ are identical or different and each, independently of one another, fluorine, chlorine, bromine, iodine, hydrogen, $C_1$-$C_{10}$-alkyl, $C_2$-$C_{10}$-alkenyl, $C_6$-$C_{15}$-aryl, $C_7$-$C_{40}$-alkylaryl, $C_7$-$C_{40}$-arylalkyl, —$OR^{6A}$ or —$NR^{6A}R^{7A}$ or two radicals $X^A$ are joined to one another and form, for example, a substituted or unsubstituted diene ligand, in particular a 1,3-diene ligand, or a biaryloxy group, where $R^{6A}$ and $R^{7A}$ are each $C_1$-$C_{10}$-alkyl, $C_6$-$C_{15}$-aryl, $C_7$-$C_{40}$-arylalkyl, $C_7$-$C_{40}$-alkylaryl, fluoroalkyl or fluoroaryl each having from 1 to 16 carbon atoms in the alkyl radical and from 6 to 21 carbon atoms in the aryl radical, $n^A$ is 1, 2 or 3 and is such that, depending on the valence of M, the metallocene complex of the general formula (I) is uncharged, $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, C2-C22-alkenyl, $C_6$-$C_{22}$-aryl, $C_7$-$C_{40}$-arylalkyl, $C_7$-$C_{40}$-alkylaryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably five-, six- or seven-membered ring or a preferably five-, six- or seven-membered heterocycle which comprises at least one atom from the group consisting of N, P, O or S, where the radicals $R^{8A}$ are identical or different and can each be $C_1$-$C_{10}$-alkyl, $C_3$-$C_{10}$-cycloalkyl, $C_8$-$C_{16}$-aryl, $C_1$-$C_1$-alkoxy or $C_6$-$C_{10}$-aryloxy and $Z^A$ is as defined for $X^A$ or is

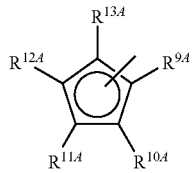

where the radicals $R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_8$-$C_{22}$-aryl, $C_7$-$C_{40}$-arylalkyl, $C_7$-$C_{40}$-alkylaryl, —$NR^{14A}_2$, —$N(SiR^{14A}_3)_2$, —$OR^{14A}$, —$OSiR^{14A}_3$, —$SiR^{14A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably five-, six- or seven-membered ring or a preferably five-, six- or seven-membered heterocycle which comprises at least one atom from the group consisting of N, P, O or S, where the radicals $R^{14A}$ are identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, or the radicals $R^{4A}$ and $Z^A$ together form an —$R^{15A}_{\ v}A$—$A^A$— group in which $R^{15A}$ is

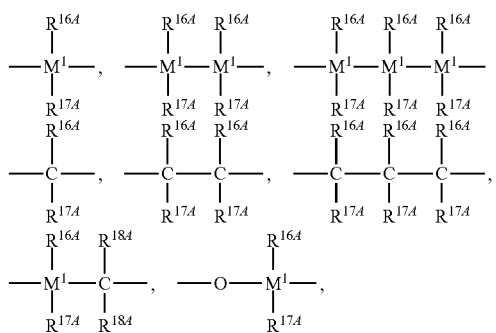

—$BR^{16A}$—, —$(BNR^{16A}R^{17A})$—, —$AiR^{16A}$—, —Ge—, —Sn—, —O—, —S—, —SO—, —SO$_2$—, —$NR^{16A}$—, —CO—, —$PR^{16A}$— or —$(POR^{16A})$—, where $R^{16A}$, $R^{17A}$ and $R^{18A}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_5$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_6$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2A}$ is silicon, germanium or tin, preferably silicone, $A^A$ is —O—, —S—, —$NR^{19A}$—, —$PR^{19A}$—, —O—$R^{19A}$, —$NR^{19A}_2$, —$PR^{19A}_2$ or an unsubstituted, substituted or fused, heterocyclic ring system, where the radicals $R^{19A}$ are each, independently of one another, $C_1$-$C_{10}$-alkyl, $C_6$-$C_{16}$-aryl, $C_3$-$C_{10}$-cycloalkyl, $C_7$-$C_{18}$-alkylaryl or —Si($R^{20A}$)$_3$, $R^{20A}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, $v^A$ is 1 or when $A^A$ is an unsubstituted, substituted of fused, heterocyclic ring system is 1 or 0, or the radicals $R^{4A}$ and $R^{12A}$ together form a —$R^{15A}$— group.

It is preferred that the radicals $X^A$ in the general formula (I) are identical, preferably fluorine, chlorine, bromine, $C_1$-$C_7$-alkyl or arylalkyl, in particular chlorine, methyl or benzyl.

Among the organic transition metal compounds of the general formula (I), preference is given to

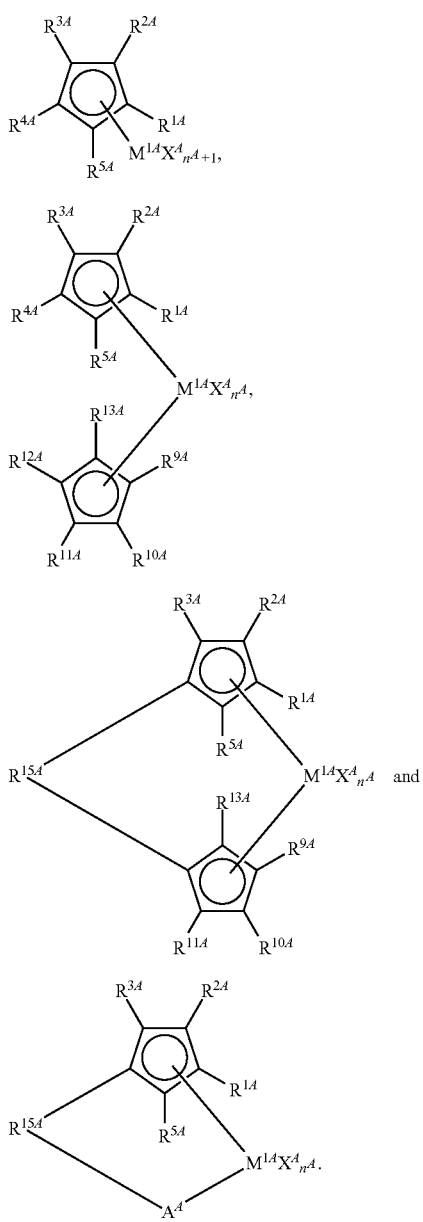

Among the compounds of the formula (Ia), particular preference is given to those in which $M^{1A}$ is titanium or chromium, $X^A$ is chlorine, $C_1$-$C_4$-alkyl, phenyl, alkoxy or aryloxy, $n^A$ is 1 or 2 and $R^{1A}$ to $R^{5A}$ are each hydrogen or $C_1$-$C_4$-alkyl or two adjacent radicals $R^{1A}$ to $R^{5A}$ together with the atoms connecting them form a substituted or unsubstituted unsaturated six-membered ring.

Among the metallocenes of the formula (Ib), preference is given to those in which $M^{1A}$ is titanium, zirconium, hafnium or chromium, $X^A$ is chlorine, $C_1$-$C_4$-alkyl or benzyl, or two radicals X form a substituted or unsubstituted butadiene ligand, $n^A$ is 1 or 2, preferably 2, or when $M^{1A}$ is chromium is 0, $R^{1A}$ to $R^{5A}$ are each hydrogen, $C_1$-$C_8$-alkyl, $C_6$-$C_{10}$-aryl, —$NR^{8A}{}_2$, —$OSiR^{8A}{}_3$, —$SiR^{8A}{}_3$ or —$Si(R^{8A})_3$ and $R^{9A}$ to $R^{13A}$ are each hydrogen, $C_1$-$C_8$-alkyl, $C_6$-$C_{10}$-aryl, —$NR^{8A}{}_2$, —$OSiR^{8A}{}_3$, —$SiR^{8A}{}_3$ or —$Si(R^{8A})_3$ or two radicals $R^{1A}$ to $R^{5A}$ and/or $R^{9A}$ to $R^{13A}$ together with the cyclopentadienyl ring form an indenyl or substituted indenyl system.

The compounds of the formula (Ib) In which the cyclopentadienyl radicals are identical are particularly useful.

Particularly useful metallocenes of the formula (Ic) are those in which $R^{1A}$ and $R^{9A}$ are identical or different and are each hydrogen or a $C_1$-$C_{10}$-alkyl group, $R^{5A}$ and $R^{13A}$ are identical or different and are each hydrogen or a methyl, ethyl, isopropyl or tert-butyl group, $R^{3A}$ and $R^{11A}$ are each $C_1$-$C_4$-alkyl and $R^{2A}$ and $R^{10A}$ are each hydrogen or two adjacent radicals $R^{2A}$ and $R^{3A}$ and/or $R^{10A}$ and $R^{11A}$ together form a saturated or unsaturated cyclic group having from 4 to 44 carbon atoms, $R^{15A}$ is —$M^{2A}R^{16A}R^{17A}$— or —$CR^{16A}R^{17A}$—$CR^{16A}R^{17A}$— or —$BR^{16A}$— or —$BNR^{16A}R^{17A}$—, $M^{1A}$ is titanium, zirconium or hafnium and the radicals $X^A$ are identical or different and area each chlorine, $C_1$-$C_4$-alkyl, benzyl, phenyl or $C_7$-$C_{15}$-alkylaryloxy.

Compounds of the formula (Ic) which are especially useful are those of the formula (Ic')

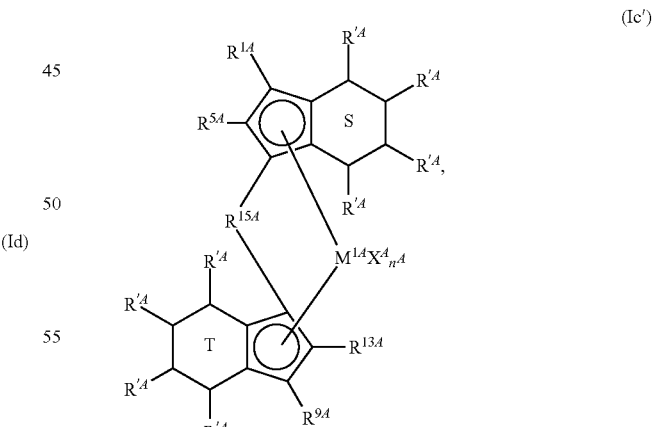

where the radicals $R'^A$ are identical or different and are each hydrogen, $C_1$-$C_{10}$-alkyl or $C_3$-$C_{10}$-cycloalkyl, preferably methyl, ethyl, isopropyl or cyclohexyl, $C_6$-$C_{20}$-aryl, preferably phenyl, naphthyl or mesityl, $C_7$-$C_{40}$-arylalkyl, $C_7$-$C_{40}$-alkylaryl, preferably 4-tert-butylphenyl or 3,5-di-tert-butylphenyl, or $C_8$-$C_{40}$-arylalkenyl, $R^{5A}$ and $R^{13A}$ are identical or different and are each hydrogen, $C_1$-$C_8$-alkyl, preferably methyl, ethyl, isopropyl, n-propyl, n-butyl, n-hexyl or tert-butyl, and the rings S and T are identical or different and saturated, unsaturated or partially saturated.

The indenyl or tetrahydroindenyl ligands of the metallocenes of the formula (Ic') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular the 2,4 positions, with the following numbering applying to the site of substitution:

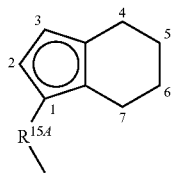

As complexes (Ic'), preference is given to using bridged bis-indenyl complexes in the rac or pseudo-rac form. The term "pseudo-rac form" refers to complexes in which the two indenyl ligands are in the rac arrangement relative to one another when all other substituents of the complex are disregarded.

Particularly useful compounds of the general formula (Id) are those in which $M^{1A}$ is titanium or zirconium, in particular titanium, and $X^A$ is chlorine, $C_1$-C4-alkyl or phenyl or two radicals X form a substituted or unsubstituted butadiene ligand, $R^{15A}$ is —SiR$^{16A}$R$^{17A}$— or —CR$^{16A}$R$^{17A}$—CR$^{16A}$R$^{17A}$— and $A^A$ is —O—, —S— or —NR$^{19A}$—, $R^{1A}$ to $R^{3A}$ and $R^{5A}$ are each hydrogen, $C_1$-$C_{10}$-alkyl, preferably methyl, $C_3$-$C_{10}$-cycloalkyl, $C_6$-$C_{15}$-aryl or —Si(R$^{8A}$)$_3$, or two adjacent radicals form a cyclic group having from 4 to 12 carbon atoms, with preference being given to all $R^{1A}$ to $R^{3A}$ and $R^{5A}$ being methyl.

Further suitable organic transition metal compounds A) include metallocenes having at least one ligand derived from a cyclopentadienyl or heterocyclopentadienyl group having a fused-on heterocycle, with at least one carbon atom in the heterocycles being replaced by a heteroatom which is preferably selected from group 15 or 16 of the Periodic Table, in particular by nitrogen or sulfur. Such compounds are described, for example, in WO 98/22486. These are, in particular, dimethylsilanediyl-(2-methyl-4-phenylindenyl)(2,5-dimethyl-N-phenyl-4-azapentalene)zirconium dichloride dimethylsilanediylbis(2-methyl-4-phenyl-4-hydroazulenyl) zirconium dichloride and dimethylsilanediylbis(2-ethyl-4-phenyl-4-hydroazulenyl) zirconium dichloride.

Further organic transition metal compounds which are suitable for the purposes of the invention are transition metal complexes with at least one ligand of the general formulae (IIe) to (IIe),

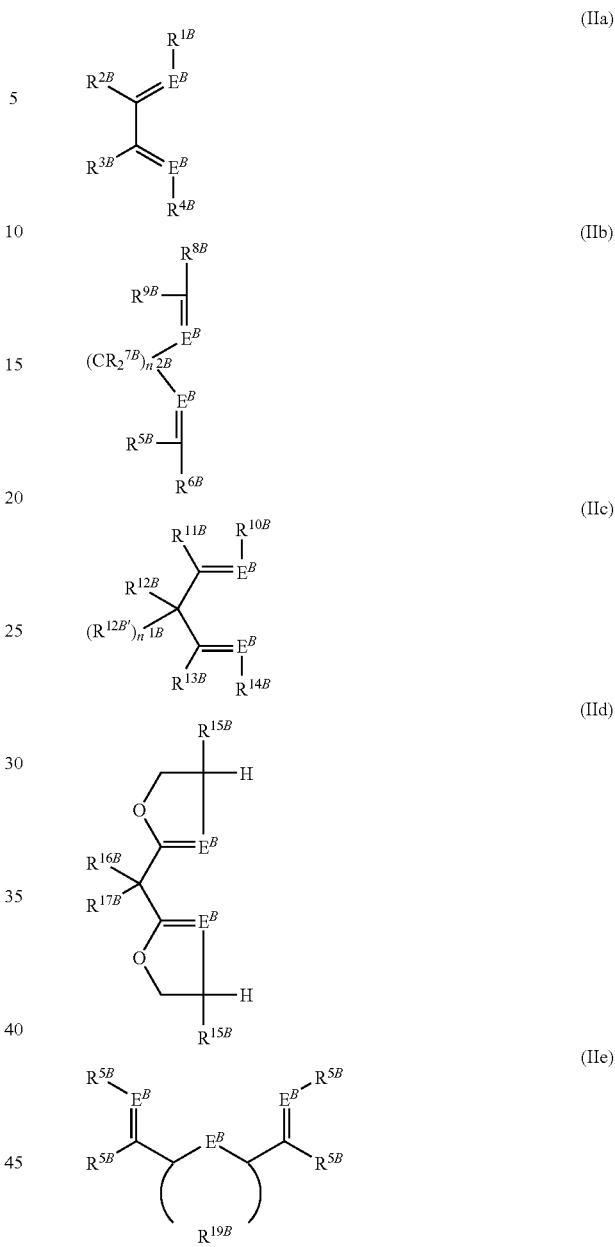

where the transition metal is selected from among the elements Ti, Zr, Hf, Sc, V, Nb, Ta, Cr, Mo, W, Fe, Co, Ni, Pd, Pt and the elements of the rare earth metals. Preference is given to compounds having nickel, iron, cobalt or palladium as central metal.

$E^B$ is an element of group 15 of the Periodic Table of the Elements, preferably N or P, with particular preference being given to N. The two or three atoms $E^B$ in a molecule can be identical or different.

The radicals $R^{1B}$ to $R^{19B}$, which may be identical or different within a ligand system of one of the formulae (IIa) to (IIe), are as follows:

$R^{1B}$ and $R^{4B}$ are each, independently of one another, a hydrocarbon radical or a substituted hydrocarbon radical, preferably a hydrocarbon radical in which the carbon atom adjacent to the element $E^B$ Ii bound to at least two carbon atoms, $R^{2B}$ and $R^{3B}$ are each, independently of one another, hydrogen, a hydrocarbon radical or a substituted hydrocarbon radical, where $R^{2B}$ and $R^{3B}$ may together also form a ring system in which one or more heteroatoms may be present, $R^{6B}$ and $R^{8B}$ are each, independently of one another, a hydrocarbon radical or a substituted hydrocarbon radical, $R^{5B}$ and $R^{9B}$ are each, independently of one another, hydrogen, a hydrocarbon radical or a substituted hydrocarbon radical, where $R^{6B}$ and $R^{5B}$ and/or $R^{8B}$ and $R^{9B}$ may together also form a ring system;

the radicals $R^{7B}$ are each, independently of one another, hydrogen, a hydrocarbon radical or a substituted hydrocarbon radical, where two radicals $R^{7A}$ may together also form a ring system, $R^{10B}$ and $R^{14B}$ are each, independently of one another, a hydrocarbon radical or a substituted hydrocarbon radical, $R^{11B}$, $R^{12B}$, $R^{12B'}$ and $R^{13B}$ are each, independently of one another, hydrogen, a hydrocarbon radical or a substituted hydrocarbon radical, where two or more geminal or vicinal radicals $R^{11B}$, $R^{12B}$, $R^{12B'}$ and $R^{13B}$ may together also form a ring system, $R^{15B}$ and $R^{18B}$ are each, independently of one another, hydrogen, a hydrocarbon radical or a substituted hydrocarbon radical, $R^{16B}$ and $R^{17B}$ are each, independently of one another, hydrogen, a hydrocarbon radical or a substituted hydrocarbon radical, $R^{19B}$ is an organic radical which forms a 5- to 7-membered substituted or unsubstituted, in particular unsaturated or aromatic heterocyclic ring system, in particular together with $E^B$ a pyridine system, $n^{1B}$ is 0 or 1, with the compound of the formula (IIc) being negatively charged when $n^{1B}$ is 0, and $n^{2B}$ is an integer from 1 to 4, preferably 2 or 3.

Particularly suitable transition metal complexes with ligands of the general formulae (IIa) to (IId) are, for example, complexes of the transition metals Fe, Co, Ni, Pd or Pt with ligands of the formula (IIa).

Particularly suitable compounds (IIe) are those described in J. Am. Chem. Soc. 120, p. 4049 ff. (1998), J. Chem. Soc., Chem. Commun. 1998, 849. Preferred complexes with ligands (IIe) are 2,6-bis(imino)pyridyl complexes of the transition metals Fe, Co, Ni, Pd or Pt, in particular Fe.

Iminophenoxide complexes can also be used as organic transition metal compound. The ligands of these complexes are prepared, for example, from substituted or unsubstituted salicylaldehydes and primary amines, in particular substituted or unsubstituted arylamines. Transition metal complexes with pl ligands comprising one or more heteroatoms in the pl system, for example the boratabenzene ligand, the pyrrolyl anion or the phospholyl anion, can also be used as organic transition metal compounds A).

Further transition metal compounds which are suitable for the purposes of the invention are substituted monocyclopentadienyl, monoindenyl, monofluorenyl or heterocyclopentadienyl complexes of chromium, molybdenum or tungsten in which at least one of the substituents of the cyclopentadienyl ring bears a rigid donor function which is not bound exclusively via sp³-hybridized carbon or silicon atoms. The most direct link to the donor function in this case comprises at least one sp- or sp²-hybridized carbon atom, preferably from one to three sp²-hybridized carbon atoms. The direct link preferably comprises an unsaturated double bond, an aromatic or together with the donor forms a partially unsaturated or aromatic heterocyclic system.

In the transition metal compounds, the cyclopentadienyl ring can also be a heterocyclopentadienyl ligand, i.e. at least one carbon atom can be replaced by a heteroatom of group 15 or 16. In this case, preference is given to a carbon atom in the $C_5$ ring being replaced by phosphorus. In particular, the cyclopentadienyl ring is substituted by further alkyl groups which may also form a five- or six-membered ring such as tetrahydroindenyl, indenyl, benzindenyl or fluorenyl.

Possible donors are uncharged functional groups comprising an element of group 15 or 16 of the Periodic Table, e.g. amine, imine, carboxamide, carboxamide, carboxylic ester, ketone (oxo), ether, thioketone, phosphine, phosphite, phosphine oxide, sulfonyl, sulfonamide or unsubstituted, substituted or fused, partially unsaturated heterocyclic or heteroaromatic ring systems.

Preference is here given to using substituted monocyclopentadienyl, monoindenyl, monofluorenyl or heterocyclopentadienyl complexes of the general formula (III)

where $M^C$ is chromium, molybdenum or tungsten and $Z^C$ has the following general formula (IIIa)

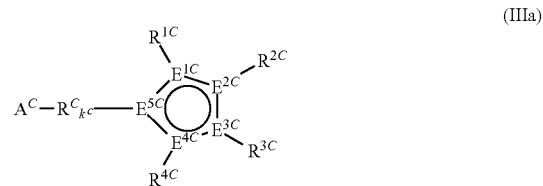

where the variables have the following meanings:

$E^{1C}$-$E^{5C}$ are each carbon or not more than one atom $E^{1C}$ to $E^{5C}$ is phosphorus or nitrogen, $A^C$ is $-NR^{5C}R^{6C}$, $-PR^{5C}R^{6C}$, $-OR^{5C}$, $-SR^{5C}$ or an unsubstituted, substituted or fused, partially unsaturated heterocyclic or heteroaromatic ring system, $R^C$ is one of the following groups,

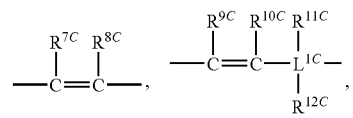

or when $A^C$ is an unsubstituted, substituted or fused, partially unsaturated heterocyclic or heteroaromatic ring system may also be

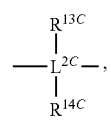

where $L^{1C}$, $L^{2C}$ are each silicon or carbon, $k^C$ is 1 or when $A^{1C}$ is an unsubstituted, substituted or fused, partially unsaturated heterocyclic or heteroaromatic ring system may also be 0, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, —$NR^{15C}R^{16C}$, —$OR^{15C}$, —$SR^{15C}$, —$SO_3R^{15C}$, —OC(O)$R^{15C}$, —CN, —SCN, β-diketonae, —CO, $BF_4^-$, $PF_6^-$ or bulky uncoordinating anions, $R^{1C}$-$R^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl radical and 6-20 carbon atoms in the aryl radical, $SiR^{17C}_3$, where the organic radicals $R^{1B}$-$R^{16B}$ may also be substituted by halogens and two geminal or vicinal radicals $R^{1C}$-$R^{16C}$ may also be joined to form a five- or six-membered ring, the radicals $R^{17C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, or two geminal radicals $R^{17C}$ may also be joined to form a five- or six-membered ring, $n^C$ is 1, 2 or 3 and $m^C$ is 1, 2 or 3.

In particular, the transition metal $M^C$ is chromium.

Further transition metal compounds which are suitable for the purposes of the invention are imidochromium compounds of the general formula (IV),

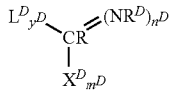

(IV)

where the variables have the following meanings:

$R^D$ is $R^{1D}C$=$NR^{2D}$, $R^{1D}C$=O, $R^{1D}C$=O(OR$^{2D}$), $R^{1D}C$=S, $(R^{1D})_2P$=O, $(OR^{1D})_2P$=O, $SO_2R^{1D}$, $R^{1D}R^{20}C$=N, $NR^{1D}R^{2D}$ or $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, $C_7$-$C_{40}$-alkylaryl, hydrogen if it is bound to a carbon atom, where the organic radicals $R^{1D}$ and $R^{2D}$ may also bear inert substituents, the radicals $X^D$ are each, independently of one another, fluorine, chlorine, bromine, iodine, —$NR^{3D}R^{4D}$, —NP$(R^{3D})_3$, —$OR^{3D}$, —$OSi(R^{3D})_3$, —$SO_3R^{3D}$, —OC(O)$R^{3D}$, β-diketonate, $BF_4^-$, $PF_6^-$ or a bulky weakly coordinating or noncoordinating anion, $R^{1D}$-$R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl, hydrogen if it is bound to a carbon atom, where the organic radicals $R^{1D}$ to $R^{4D}$ may also bear inert substituents, $n^D$ is 1 or 2, $m^D$ is 1, 2 or 3 and is such that, depending on the valence of Cr, the metallocene complex of the general formula (IV) is uncharged, $L^D$ is an uncharged donor and $y^D$ is from 0 to 3.

Such compounds and their preparation are described, for example, in WO 01/09148.

Preference is also given to using the organic transition metal compounds as mixtures of the abovementioned types.

Some of the organic transition metal compounds have little polymerization activity on their own and are therefore brought into contact with an activating compound in order to be able to display good polymerization activity. For this reason, the catalyst system optionally comprises one or more activating compounds as cocatalysts.

Suitable cocatalysts are, for example, compounds such as an aluminoxane, a strong uncharged Lewis acid, an ionic compound having a Lewis-acid cation or an ionic compound having a Brönsted acid as cation. Preference is given to aluminoxanes. A particularly useful aluminoxane is methylaluminoxane (MAO).

The amount of activating compounds to be used depends on the type of activator. In general, the molar ratio of metal complex to activating compound C) can be from 1:0.1 to 1:10000, preferably from 1:1 to 1:2000.

As strong, uncharged Lewis acids, preference is given to compounds of the general formula (VI)

(VI)

where $M^{2D}$ is an element of group 13 of the Periodic Table of the Elements, in particular B, Al or Ga, preferably B, $X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Further examples of strong, uncharged Lewis acids are given in WO 00/31090.

Suitable ionic compounds having Lewis-acid cations include salt-like compounds of the cation of the general formula (XIII)

(XIII)

where $M^{3D}$ is an element of groups 1 to 16 of the Periodic Table of the Elements, $Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, d corresponds to the difference a–z, but d is greater than or equal to 1.

Ionic compounds having Brönsted acids as cations preferably likewise have noncoordinating counterions. As Brönsted acid, particular preference is given to protonated amine or aniline derivatives. Preferred cations are N,N-dimethylanllinium, N,N-dimethylcylohexylammonium and N,N-dimethylbenzylammonium and also derivatives of the latter two. Further activating compounds are mentioned in WO 00/31090.

Suitable activating compounds C) also include boron-aluminum compounds such as di[bis(pentafluorophenyl)boroxy]methylalane. Examples of such boron-aluminum compounds are those disclosed in WO 99/06414.

It is also possible to use mixtures of all the abovementioned activating compounds C). Preferred mixtures comprise aluminoxanes, in particular methylaluminoxane, and an ionic compound, in particular one comprising the tetrakis(pentafluorophenyl)borate anion, and/or a strong uncharged Lewis acid, in particular tris(pentafluorophenyl)borane or a boroxine.

For the organic transition metal compounds and, if appropriate, the activating compounds to be able to be used in polymerization processes in a gas-phase fluidized-bed reactor, it is often advantageous, and preferred for the purposes of the invention, for them to be used in the form of a solid, i.e. for them to be applied to a solid support. This method enables, for example, deposits in the reactor to be suppressed further or avoided and the polymer morphology to be controlled.

To obtain such a supported catalyst system, the unsupported catalyst system can be reacted with a support. The order in which support, organic transition metal complex and the activating compound are combined is in principle immaterial. The organic transition metal complex and the activating compound can be immobilized independently of one another, i.e. in succession, or simultaneously. Thus, the support can firstly be brought into contact with the activating compound or compounds or the support can also firstly be brought into contact with the organic transition metal complex. Preactivation of the organic transition metal complex with one or more activating compounds before mixing with the support is also possible. In one possible embodiment, the organic transition metal complex can also be prepared in the presence of the support.

The supports used preferably have a specific surface area in the range from 10 to 1000 $m^2/g$, a pore volume in the range from 0.1 to 5 ml/g and a mean particle diameter of from 1 to 500 μm. Preference is given to supports having a specific surface area in the range from 50 to 700 $m^2/g$, a pore volume in the range from 0.4 to 3.5 ml/g and a mean particle diameter in the range from 5 to 350 μm. Particular preference is given to supports having a specific surface area in the range from 200 to 550 $m^2/g$, a pore volume in the range from 0.5 to 3.0 ml/g and a mean particle diameter of from 10 to 150, in particular 30-1200 μm.

As inorganic support materials, preference is given to using silica gel, magnesium chloride, aluminum oxide, mesoporous materials, aluminosilicates and hydrotalcites. Particular preference is given to using silica gel, since particles whose size and structure may be suitable as supports for olefin polymerization can be produced from this material. Spray-dried silica gels comprising spherical agglomerates of smaller granular particles, i.e. primary particles, have been found to be particularly useful. The silica gels can be dried and/or calcined before use.

Suitable organic supports are, for example, polyethylene, polypropylene or polystyrene, which are preferably likewise freed of adhering moisture, solvent residues or other impurities by means of appropriate purification and drying operations before use. It is also possible to use functionalized, polar polymer supports, e.g. ones based on polystyrene, polyethylene, polypropylene or polytetrafluoroethylene, via whose functional groups, for example ammonium or hydroxy groups, at least one of the catalyst components can be immobilized. Here, particular mention may be made of copolymers of ethylene and acrylic esters, acrolein or vinyl acetate.

For the purposes of the present invention, hybrid catalysts are mixtures of various catalysts, in particular two or more single-site catalysts. These can be present together on one support or can be used on separate supports.

The first and second catalysts can in principle be metered into the reactor in any way. The metered addition is preferably carried out as described in EP-A-226 935 and DE-A-103 17 533.

The present invention is illustrated below with the aid of examples, without being restricted thereto.

EXAMPLES

A polymerization of ethylene with hexene as copolymer was carried out in a gas-phase fluidized-bed reactor having an output of 50 kg/h. Polymerizations were carried out using the following catalysts under the following conditions.

Catalyst 1

A Phillips catalyst based on chromium oxide (0.3% of Cr on $SiO_2$; activated at 680° C. for 5 hours) was used as catalyst.

As initially charged polymer particles, use was made of 125 kg of a polymer which had been prepared using a Phillips catalyst and had an MFR (190° C./21.6 kg) of 13, a density of 0.938 $g/cm^3$ and a bulk density of 490 g/l. The start-up of the reactor was in each case carried out under the following conditions:

| | |
|---|---|
| $C_2H_4$ | 51% by volume |
| $N_2$ | 44% by volume |
| $H_2$ | 2.0% by volume |
| Propane | 0% by volume |
| Hexane | 2.8% by volume |
| Hexene | 0.30% by volume |
| Reactor temperature | 112° C. |
| Reactor pressure | 2.0 MPa |
| Alkyl: Trihexylaluminum (THA) | 0.8* g/h |
| Antistatic | Yes** |

*in addition, 4 g of THA were added before the start of the metered addition of catalyst.
**0.4 g of antistatic were added before the start of the metered addition of catalyst. 0.10 g/h were then metered in.

After a start-up phase of about 26 hours, the following conditions were set:

| | |
|---|---|
| $C_2H_4$ | 54% by volume |
| $N_2$ | 43% by volume |
| $H_2$ | 0% by volume |
| $H_2/C_2H_4$ ratio | 0 l/kg |
| Propane | 0% by volume |
| Hexane | 2.70% by volume |
| Hexene | 0.32% by volume |
| Hexene/$C_2H_4$ ratio | 0.031 kg/kg |
| Reactor temperature | 112.3° C. |
| Reactor pressure | 2.0 MPa |
| Alkyl: Trihexylaluminum (THA) | 0.45 g/h |
| Antistatic | 3 ppm |
| Output | 53 kg/h |
| Mass of bed | 125 kg |
| MFR (190° C./21.6 kg) | 13.5 g/10 min |
| Density | 0.938 $g/cm^3$ |
| Bulk density | 520 $kg/m^3$ |

Catalyst 2

A hybrid catalyst based on a hafnocene and an iron-bisimine complex as described in DE 10 2005 035477 was used as catalyst.

As initially charged polymer particles, use was made of 120 kg of a polymer which had been prepared using a metallocene catalyst and had an MFR (190/2.16 kg) of 13, a density of 0.927 $g/cm^3$. The start-up of the reactor was in each case carried out under the following conditions:

| | |
|---|---|
| $C_2H_4$ | 44% by volume |
| $N_2$ | 50% by volume |
| $H_2$ | 8.0 l/h |
| Propane | 0% by volume |
| Hexane | 5.0% by volume |
| Hexene | 0.50% by volume |

-continued

| | | |
|---|---|---|
| Reactor temperature | 105° | C. |
| Reactor pressure | 2.0 | MPa |
| Alkyl: Triisobutylaluminum (TiBA) | 0.6* | g/h |
| Antistatic | Yes** | |

*in addition, 4 g of THA were added before the start of the metered addition of catalyst.
**2.4 g of antistatic were added before the start of the metered addition of catalyst. 0.25 g/h were then metered in.

After a start-up phase of about 26 hours, the following conditions were set:

| | | |
|---|---|---|
| $C_2H_4$ | 48% | by volume |
| $N_2$ | 46% | by volume |
| $H_2$ | 0 | l/h |
| $H_2/C_2H_4$ ratio | 0 | l/kg |
| Propane | 0% | by volume |
| Hexane | 5.0% | by volume |
| Hexene | 0.49% | by volume |
| Hexene/$C_2H_4$ ratio | 0.038 | kg/kg |
| Reactor temperature | 105° | C. |
| Reactor pressure | 2.0 | MPa |
| Alkyl: Triisobutylaluminum (TiBA) | 0.40 | g/h |
| Antistatic | 9 | ppm |
| Output | 40 | kg/h |
| Mass of bed | 130 | Kg |
| MFR (190° C./21.6 kg) | 30 | g/10 min |
| Density | 0.934 | g/cm³ |
| Bulk density | 480 | kg/m³ |

Catalyst 3

A commercially available supported bis(indenyl)ZrCl2 metallocene catalyst was used as catalyst.

As initially charged polymer particles, use was made of 120 kg of a polymer which had been prepared using a metallocene catalyst and had an MFR (190/2.16 kg) of 5, a density of 0.918 g/cm³. The start-up of the reactor was in each case carried out under the following conditions:

| | | |
|---|---|---|
| $C_2H_4$ | 64% | by volume |
| $N_2$ | 32% | by volume |
| $H_2$ | 2.0 | l/h |
| Propane | 0% | by volume |
| Hexane | 2.5% | by volume |
| Hexene | 1.4% | by volume |
| Reactor temperature | 92° | C. |
| Reactor pressure | 2.0** | MPa |
| Alkyl: Triisobutylaluminum (TiBA) | 0.5* | g/h |
| Antistatic | 0 | ppm |

*in addition, 6 g of THA were added before the start of the metered addition of catalyst.
**after a reaction time of 12 hours, the reactor pressure was increased to 2.5 MPa.

After a start-up phase of about 26 hours, the following conditions were set:

| | | |
|---|---|---|
| $C_2H_4$ | 64% | by volume |
| $N_2$ | 32% | by volume |
| $H_2$ | 11 | l/h |
| $H_2/C_2H_4$ ratio | 0.24 | l/kg |
| Propane | 0% | by volume |
| Hexane | 1.8% | by volume |
| Hexene | 1.65% | by volume |
| Hexene/$C_2H_4$ ratio | 0.115 | kg/kg |
| Reactor temperature | 92° | C. |
| Reactor pressure | 2.5 | MPa |
| Alkyl: Triisobutylaluminum (TiBA) | 0.50 | g/h |
| Antistatic | 3 | ppm |
| Output | 45 | kg/h |
| Mass of bed | 120 | kg |
| MFR (190° C./2.16 kg) | 2.6 | g/10 min |
| Density | 0.922 | g/cm³ |
| Bulk density | 360 | kg/m³ |

Catalyst 4

A Ziegler catalyst (Avant Z230M, Basell) was used as catalyst.

As initially charged polymer particles, use was made of 125 kg of a polymer which had been prepared using a metallocene catalyst and had an MFR (190/2.16 kg) of 1.1 and a density of 0.918 g/cm³. The start-up of the reactor was in each case carried out under the following conditions:

| | | |
|---|---|---|
| $C_2H_4$ | 35% | by volume |
| $N_2$ | 15% | by volume |
| $H_2$ | 4.0% | by volume |
| Propane | 35% | by volume |
| Hexane | 0% | by volume |
| Butene | 11.0% | by volume |
| Reactor temperature | 83° | C. |
| Reactor pressure | 2.0 | MPa |
| Alkyl: Triisobutylaluminum (TiBA) | 6.0* | g/h |
| Antistatic | 0 | ppm |

*in addition, 30 g of THA were added before the start of the metered addition of catalyst.

After a start-up phase of about 26 hours, the following conditions were set:

| | | |
|---|---|---|
| $C_2H_4$ | 23% | by volume |
| $N_2$ | 20% | by volume |
| $H_2$ | 4.7% | by volume |
| $H_2/C_2H_4$ ratio | 6 | l/kg |
| Propane | 40% | by volume |
| Hexane | 0% | by volume |
| Butene | 11.3% | by volume |
| Butene/$C_2H_4$ ratio | 0.130 | kg/kg |
| Reactor temperature | 84° | C. |
| Reactor pressure | 2.0 | MPa |
| Alkyl: Triisobutylaluminum (TiBA) | 6.0 | g/h |
| Antistatic | 0 | ppm |
| Output | 50 | kg/h |
| Mass of bed | 130 | kg |
| MFR (190° C./2.16 kg) | 1.0 | g/10 min |
| Density | 0.919 | g/cm³ |
| Bulk density | 380 | kg/m³ |

Example 1

Catalyst changes involving the catalysts 1 to 4 were carried out using the following procedure:

The polymerization using the first catalyst was stopped by means of oxygen when the first catalyst was a chromium-based Phillips catalyst and by means of carbon dioxide in the case of all other catalysts. A fresh fluidized bed charge was introduced and fluidized for a time of 12 hours by means of nitrogen with addition of a solution comprising 27 g of Costelan® AS 100 (commercial product of Costenoble GmbH, constituents: a polyethoxyalkylamine, a polyamino polyol and an alkylarylsulfonic acid), 27 g of Atmer® (manufactured by Uniqema, marketed by Ciba Spezialitätenchemie GmbH, Germany), 4 l of 2-propanol and 4 l of hexane in an amount of 500 g/h at a temperature of 110° C. and a pressure of 2.0 MPa (20 bar).

The fluidized bed was subsequently discharged, the reactor was depressurized and opened. The polymer particles remaining in the reactor were removed. The reactor was closed and run moisture- and oxygen-free for a time of about 12-16 hours.

The new fluidized bed charge was subsequently introduced. The reaction conditions prescribed for the respective catalyst were set and the polymerization was commenced as described above. The results of the various catalyst changes are shown in the following table.

The total time for the catalyst change was about 33-37 hours.

The products obtained using the second catalyst were processed on a film blowing machine to produce films. A visual examination for its inhomogeneities, known as specks, was carried out on the films.

TABLE 1

| First catalyst | Second catalyst | Comments |
|---|---|---|
| 1 | 2 | Problem-free reactor start-up, no lumps, no specks |
| 1 | 3 | Problem-free reactor start-up, no lumps, no specks |
| 1 | 4 | Problem-free reactor start-up, no lumps, no specks |
| 2 | 1 | Problem-free reactor start-up, no lumps, no specks |
| 2 | 3 | Problem-free reactor start-up, no lumps, no specks |
| 2 | 4 | Problem-free reactor start-up, no lumps, no specks |
| 3 | 1 | Problem-free reactor start-up, no lumps, no specks |
| 3 | 2 | Problem-free reactor start-up, no lumps, no specks |
| 3 | 4 | Problem-free reactor start-up, no lumps, no specks |
| 4 | 1 | Problem-free reactor start-up, no lumps, no specks |
| 4 | 2 | Problem-free reactor start-up, no lumps, no specks |
| 4 | 3 | Problem-free reactor start-up, no lumps, no specks |

Example 2

Catalyst changes involving the catalysts 1 to 4 were carried out using the following procedure:

The polymerization using the first catalyst was stopped by means of oxygen when the first catalyst was a chromium-based Phillips catalyst and by means of carbon dioxide in the case of all other catalysts. A fresh fluidized bed charge was introduced and fluidized for a time of 6 hours by means of nitrogen with addition of a solution comprising 27 g of Costelan® AS 100 (commercial product of Costenoble GmbH), 27 g of Atmer® (manufactured by Uniqema, marketed by Ciba Spezialitätenchemie GmbH, Germany), 4 l of 2-propanol and 4 l of hexane in an amount of 300 g/h at a temperature of 110° C. (1° C. below the sintering temperature) and a pressure of 2.0 MPa (20 bar).

The fluidized bed was subsequently discharged, the reactor was depressurized and opened. The polymer particles remaining in the reactor were removed. The reactor was closed and run moisture- and oxygen-free for a time of about 8 hours.

The new fluidized bed charge was subsequently introduced. The reaction conditions prescribed for the respective catalyst were set and the polymerization was commenced as described above. The results of the various catalyst changes are shown in the following table.

The total time for the catalyst change was about 16 hours.

The products obtained using the second catalyst were processed on a film blowing machine to produce films. A visual examination for its inhomogeneities, known as specks, was carried out on the films.

TABLE 2

| First catalyst | Second catalyst | Comments |
|---|---|---|
| 1 | 2 | Problem-free reactor start-up, no lumps, no specks |
| 1 | 3 | Problem-free reactor start-up, no lumps, no specks |
| 1 | 4 | Problem-free reactor start-up, no lumps, no specks |
| 2 | 1 | Problem-free reactor start-up, no lumps, no specks |
| 2 | 3 | Problem-free reactor start-up, no lumps, no specks |
| 2 | 4 | Problem-free reactor start-up, no lumps, no specks |
| 3 | 1 | Problem-free reactor start-up, no lumps, no specks |
| 3 | 2 | Problem-free reactor start-up, no lumps, no specks |
| 3 | 4 | Problem-free reactor start-up, no lumps, no specks |
| 4 | 1 | Problem-free reactor start-up, no lumps, no specks |
| 4 | 2 | Problem-free reactor start-up, no lumps, no specks |
| 4 | 3 | Problem-free reactor start-up, no lumps, no specks |

Comparative Example 3 (With Water)

Catalyst changes involving various catalysts were carried out using the following procedure:

The polymerization using the first catalyst was stopped by means of oxygen as volatile deactivating agent when the first catalyst was a chromium-based Phillips catalyst and by means of carbon dioxide in the case of all other catalysts. The fluidized bed was subsequently discharged, the reactor was depressurized and opened. The polymer particles remaining in the reactor were removed. The reactor was cleaned using water as further volatile deactivating agent for a time of about 8 hours. All ports were subsequently opened and dried for a time of about 12 hours. The reactor was closed and run moisture- and oxygen-free for a time of about 48 hours.

The new fluidized bed charge was subsequently introduced.

The reaction conditions prescribed for the respective catalyst were set and the polymerization was commenced. The results of the various catalyst changes are shown in the following table.

The total time for the catalyst change was about 71 hours.

The products obtained using the second catalyst were processed on a film blowing machine to produce films. A visual examination for its inhomogeneities, known as specks, was carried out on the films.

TABLE 3

| First catalyst | Second catalyst | Comments |
|---|---|---|
| 1 | 2* | Problem-free reactor start-up, no lumps, no specks |
| 1 | 3 | Problem-free reactor start-up, no lumps, no specks |
| 1 | 4 | Problem-free reactor start-up, no lumps, no specks |
| 2 | 1* | Problem-free reactor start-up, no lumps, no specks |
| 2 | 3 | Problem-free reactor start-up, no lumps, no specks |
| 2 | 4 | Problem-free reactor start-up, no lumps, no specks |
| 3 | 1* | Problem-free reactor start-up, no lumps, no specks |
| 3 | 2* | Problem-free reactor start-up, no lumps, no specks |
| 3 | 4 | Problem-free reactor start-up, no lumps, no specks |
| 4 | 1* | Problem-free reactor start-up, no lumps, no specks |
| 4 | 2 | Problem-free reactor start-up, no lumps, no specks |
| 4 | 3 | Problem-free reactor start-up, no lumps, no specks |

*start-up of the polymerization had to be repeated. The catalyst developed its activity only 8-15 hours after reaction start-up.

Comparative Example 4

Catalyst changes involving various catalysts were carried out using the following procedure:

The polymerization using the first catalyst was stopped by means of oxygen as volatile deactivating agent when the first catalyst was a chromium-based Phillips catalyst and by means of carbon dioxide in the case of all other catalysts. The fluidized bed was subsequently discharged, the reactor was depressurized and opened. The polymer particles remaining in the reactor were removed. The reactor was closed and run moisture- and oxygen-free for a time of about 12-16 hours.

The new fluidized bed charge was subsequently introduced.

The reaction conditions prescribed for the respective catalyst were set and the polymerization was commenced. The results of the various catalyst changes are shown in the following table.

The total time for the catalyst change, if it could be carried out successfully at all, ranged from 40 hours to a number of days.

The products obtained using the second catalyst were processed on a film blowing machine to produce films. A visual examination for its inhomogeneities, known as specks, was carried out on the films.

TABLE 4

| First catalyst | Second catalyst | Comments |
|---|---|---|
| 1 | 2 | Two aborted start-ups because of wall deposits and lumps |
| 1 | 3 | One aborted start-up because of wall deposits and lumps |
| 1 | 4 | Very many specks for 24 h, speck-free only after 3 days |
| 2 | 1 | Two to three aborted start-ups because of wall deposits |
| 2 | 3 | Very many specks for 24 h, speck-free only after 3 days |
| 2 | 4 | One aborted start-up because of wall deposits and lumps |
| 3 | 1 | Three aborted start-ups because of wall deposits and lumps |
| 3 | 2 | Very many specks for 24 h |
| 3 | 4 | One aborted start-up because of wall deposits and lumps |
| 4 | 1 | One aborted start-up because of wall deposits and lumps |
| 4 | 2 | Two aborted start-ups because of wall deposits and lumps |
| 4 | 3 | One aborted start-up because of wall deposits and lumps |

Comparative Example 5

A catalyst change from catalyst 1 to catalyst 2 was carried out using the following procedure:

The polymerization using the first catalyst was stopped by means of oxygen as volatile deactivating agent. The fluidized bed was subsequently discharged, the reactor was depressurized and opened. The polymer particles remaining in the reactor were removed. The reactor was cleaned using isopropanol as volatile deactivating agent for a time of about 8 hours. The reactor was closed and run moisture- and oxygen-free for a time of about 12-16 hours.

The new fluidized bed charge was subsequently introduced. The reaction conditions prescribed for the respective catalyst were set and the polymerization was commenced.

The total time for the catalyst change was 70 hours. Slightly increased electrostatic charging in the dry reactor was observed. The product had an increased proportion of fines having particle sizes of <125 μm.

The products obtained using the second catalyst were processed on a film blowing machine to produce films. A visual examination for its inhomogeneities, known as specks, was carried out on the films. Relatively small agglomerates were found in the product.

Comparative Example 6

A catalyst change from catalyst 1 to catalyst 2 was carried out using the following procedure:

The polymerization using the first catalyst was stopped by means of oxygen as volatile deactivating agent. The fluidized bed was subsequently discharged, the reactor was depressurized and opened. The polymer particles remaining in the reactor were removed. A fresh fluidized bed charge was introduced and was fluidized for a time of 12 hours by means of nitrogen with addition of 27 g of Costelan® AS 100 (commercial product of Costenoble GmbH), 27 g of Atmer® (manufactured by Uniqema, marketed by Ciba Spezialitätenchemie GmbH, Germany) in 4 l of hexane in an amount of 500 g/h at a temperature of 110° C. and a pressure of 2.0 MPa (20 bar).

The new fluidized bed charge was subsequently introduced. The reaction conditions prescribed for catalyst 2 were set and the polymerization was commenced as described above.

The total time for the catalyst change was 35 hours. Deposits were formed in the reactor. The course of the polymerization was subject to large fluctuations. The reactor had to be shutdown after 10 hours because of a blocked discharge line.

What is claimed is:

1. A method of changing from a polymerization using a first catalyst to a polymerization using a second catalyst which is incompatible with the first catalyst in a gas-phase reactor, said method comprising:
    a) stopping the polymerization reaction using the first catalyst;
    b) flushing the reactor under polymerization conditions with at least one deactivating agent comprising a volatile component selected from an organic compound or a mixture of organic compounds comprising at least one functional group selected from the group consisting of —OR, —NR2, —SR, =O, and =S, wherein R is hydrogen or a $C_1$-$C_6$-alkyl, and a nonvolatile component in a weight ratio of from 0.1 to 1000;
    c) introducing the second catalyst into the reactor; and
    d) continuing the polymerization using the second catalyst, wherein the nonvolatile component comprises at least a polymeric amine, a polymeric amide, a polyamine, a polyamine copolymer or a polysulfone copolymer.

2. The method of claim 1, wherein the gas-phase reactor is a fluidized-bed reactor.

3. The method of claim 1, wherein at least one of the volatile or nonvolatile components has an antistatic action.

4. The method of claim 1, wherein the reactor is completely emptied and filled with fresh polymer powder in a step a') or b') prior to step b) and/or c).

5. The method of claim 1, wherein the volatile component has a boiling point below the temperature in the reactor under polymerization conditions.

6. The method of claim 1, wherein the volatile component has a vapor pressure above 1000 Pa, at 20° C.

7. The method of claim 1, wherein the volatile component is selected from the group consisting of a $C_1$-$C_4$-alcohol, a $C_2$-$C_6$ ether, and mixtures thereof.

8. The method of claim 1, wherein the nonvolatile component has a boiling point above the temperature in the reactor under polymerization conditions.

9. The method of claim 1, wherein the nonvolatile component has a vapor pressure of less than 100 Pa, at 20° C.

10. The method of claim 1, wherein the nonvolatile component is at least one of a polyethoxyalkylamine and/or a polyethoxyalkylamide.

11. The method of claim 1, wherein the nonvolatile component is a polyamino polyol.

12. The method of claim 1, wherein the weight ratio of the volatile component and nonvolatile component is from 1 to 300.

13. The method of claim 12 wherein the weight ratio of the volatile component and nonvolatile component is from 10 to 200.

14. The method of claim 13 wherein the weight ratio of the volatile component and nonvolatile component is from 20 to 100.

15. The method of claim 7, wherein the volatile component is selected from $C_2$-$C_6$ ethers.

16. The method of claim 1, wherein the polymerization reaction using the first catalyst is stopped by introducing carbon dioxide, oxygen or lean air into the reactor.

* * * * *